United States Patent
Yamada et al.

(10) Patent No.: US 7,444,221 B2
(45) Date of Patent: Oct. 28, 2008

(54) VEHICLE BACKWARD MOVEMENT DETECTION APPARATUS AND VEHICLE BRAKING FORCE CONTROL APPARATUS

(75) Inventors: Noritaka Yamada, Mishima (JP); Takashi Orimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 716 days.

(21) Appl. No.: 10/979,164

(22) Filed: Nov. 3, 2004

(65) Prior Publication Data
US 2005/0125133 A1  Jun. 9, 2005

(30) Foreign Application Priority Data
Nov. 28, 2003  (JP) .............................. 2003-400438

(51) Int. Cl.
*G06F 7/70* (2006.01)
(52) U.S. Cl. .......................................... 701/70; 701/66
(58) Field of Classification Search .................. 701/66, 701/69, 70–71, 79, 83, 89; 192/219, 219.1; 303/122.06, 125
See application file for complete search history.

(56) References Cited
U.S. PATENT DOCUMENTS
4,353,601 A * 10/1982 Jones .......................... 303/161

| | | |
|---|---|---|
| 4,629,043 A | 12/1986 | Matsuo et al. |
| 5,819,897 A | 10/1998 | Murata |
| 6,338,398 B1 | 1/2002 | Eguchi |
| 6,644,454 B2 | 11/2003 | Yamada et al. |
| 6,814,414 B1 | 11/2004 | Schmitt et al. |

FOREIGN PATENT DOCUMENTS

| | | |
|---|---|---|
| EP | 1 225 110 A1 | 7/2002 |
| JP | A-2000-108861 | 4/2000 |
| JP | A-2002-337682 | 11/2002 |

* cited by examiner

*Primary Examiner*—Gertrude Arthur Jeangla
(74) *Attorney, Agent, or Firm*—Oliff & Berridge, PLC

(57) ABSTRACT

A vehicle braking force control apparatus detects a period of time from when a braking force of a brake device is cancelled until a vehicle body speed in the backwards direction of a vehicle on a hill reaches a predetermined state, determines a brake output according to the detected period of time, and controls braking pressure according to the determined brake output. The period of time depends on the gradient of the hill. Therefore, by determining the brake output according to this period of time, braking force control according to the gradient of the hill is made possible even at an extremely slow speed at which the vehicle speed is undetectable.

18 Claims, 7 Drawing Sheets

VEHICLE BACKWARD MOVEMENT DETECTION APPARATUS AND VEHICLE BRAKING FORCE CONTROL APPARATUS

INCORPORATION BY REFERENCE

The disclosure of Japanese Patent Application No. 2003-400438 filed on Nov. 28, 2003 including the specification, drawings and abstract is incorporated herein by reference in its entirety.

BACKGROUND OF THE INVENTION

1. Field of the Invention

The invention relates to a vehicle backward movement detection apparatus and a vehicle braking force control apparatus. More particularly, the invention relates to a vehicle backward movement detection apparatus which detects backward movement of a vehicle on a hill, and a vehicle braking force control apparatus which performs braking based on that detected backward movement.

2. Description of the Related Art

A vehicle braking force control apparatus is disclosed in Japanese Patent Application Publication No. JP-A-2002-264784, for example. This vehicle braking force control apparatus increases the braking force when a vehicle body acceleration rate is greater than a predetermined value in order to stop the vehicle from moving backwards. A wheel speed sensor is used to detect the vehicle body acceleration rate.

At low speeds equal to, or less than, the detection limit of the wheel speed sensor, however, it is difficult to accurately detect the vehicle body speed and acceleration rate when the vehicle is moving backwards. Accordingly, it is also difficult to accurately control the braking force using the sensor output. In addition, it is difficult to control an increase and decrease in braking force when the vehicle body is on a road with a low μ, which often results in hunting.

SUMMARY OF THE INVENTION

It is thus an object of this invention to provide a vehicle backward movement detection apparatus capable of detecting backward movement of a vehicle on a hill and a vehicle braking force control apparatus capable of accurately controlling a braking force even when the vehicle body speed is low.

According to a first aspect of the invention, a vehicle braking force control apparatus provided with a brake device includes time detecting device for detecting a period of time from when a braking force of the brake device is cancelled until a backward movement of a vehicle on a hill reaches a predetermined state; brake output determining device for determining a brake output according to the period of time detected by the time detecting device; and controlling device for applying the braking force in response to the brake output determined by the brake output determining device.

When the braking force of the brake device in the vehicle is cancelled on a hill, gravity pulls the vehicle to a lower position. Because the vehicle body speed when the vehicle first starts to move is low, it is often difficult to measure accurately with a wheel speed sensor. This invention thus focuses on the period of time up until a signal indicative of a vehicle body speed that can be detected with some degree of accuracy by a wheel speed sensor or the like starts to be output. That is, this invention focuses on the period of time during which accurate measurement was conventionally not possible.

If the gradient of the hill is steep, the vehicle body speed will probably reach a predetermined speed quickly once the braking force is cancelled. On the other hand, if the gradient of the hill is gentle, it will probably take time for the vehicle body speed to reach the predetermined speed once the braking force is cancelled.

The time detecting device detects the period of time from when the braking force of the brake device is cancelled until the backward movement of the vehicle on the hill reaches this kind of predetermined state. The predetermined movement state refers, for example, to a state of the vehicle in which the vehicle body speed is equal to a predetermined speed, the distance moved by the vehicle body (a cumulative value of the number of output pulses from a wheel speed sensor) is equal to a predetermined distance, or the acceleration rate of the vehicle (a time derived value of the wheel speed) is equal to a predetermined acceleration rate. This period of time depends on the gradient of the hill. Therefore, even at an extremely slow speed at which the vehicle body speed is undetectable, braking force control according to the gradient of the hill is possible because the brake output determining device determines the brake output according to that period of time, and the controlling device applies a braking force in response to the determined brake output.

According to the first aspect of the invention, the predetermined state may be a state in which a vehicle body speed is equal to a predetermined value that is equal to, or greater than, a detection limit. Accordingly, if the vehicle body speed can be detected by a wheel speed sensor or the like, accurate braking force control can be performed.

According to the first aspect and the modification of that first aspect, cancellation of the braking force may be detected by detecting release of a brake pedal. Accordingly, cancellation of the braking force can be detected because the braking force is generally cancelled when the brake pedal is released. Preferably, it can be determined that the braking force is cancelled when a switch for a brake lamp of the brake is off.

According to the first aspect and the modification of that first aspect, cancellation of the braking force may be detected by detecting that the braking force is less than a cancellation determination threshold value. Accordingly, when the braking force is less than the cancellation determination threshold value, it can be determined that the braking force has been cancelled.

According to the first aspect and the modification of that first aspect, an initial value of the brake output may be set smaller when a period of time detected by the time detecting device is longer than a predetermined period of time than it is when the period of time detected by the time detecting device is shorter than the predetermined period of time. That is, when this period of time is long it means that the gradient of the hill is small, so it is preferable to set the brake output small so that braking is performed gently and smoothly. When that period of time is short, on the other hand, it means that the gradient of the hill is large, so the brake output is set relatively large so that braking can be performed quickly.

According to the first aspect, a first predetermined period of time is set longer than a second predetermined period of time, the brake device is provided on each of front wheels and rear wheels of the vehicle, and the brake output determining device the brake output so that the braking force of the brake devices on the rear wheels is set higher than the braking force of the brake devices on the front wheels when the period of time is longer than the first predetermined period of time than when the period of time is shorter than the second predetermined period of time.

The vehicle braking force control apparatus according to the first aspect and the modification of that first aspect, the brake device may be provided on each of front and rear wheels of the vehicle, and the brake output determining device determine the brake output so that the braking force of the brake devices on the rear wheels is set higher than the braking force of the brake devices on the front wheels when the period of time is longer than the predetermined period of time than when the period of time is shorter than the predetermined period of time. Accordingly, when the vehicle moves backwards on a hill, the period of time decreases the steeper the gradient and more load is placed on the rear wheels than on the front wheels. Making the braking force of the brake devices on the rear wheels relatively high therefore enables the vehicle to be effectively brought to a stop.

According to the first aspect, a first predetermined period of time is set longer than a second predetermined period of time, the brake device is provided on each of front wheels and rear wheels of the vehicle, and the brake output determining device determines the brake output so that the braking force of the brake devices on the rear wheels is set higher than the braking force of the brake devices on the front wheels when the period of time is longer than the first predetermined period of time than when the period of time is shorter than the second predetermined period of time.

According to the first aspect and the modification of that first aspect, the brake output determining device may determine the brake output such that the braking force is prohibited from being cancelled from the time the braking force is applied until a fixed period of time passes or until an accelerator operation is performed. That is, a control that cancels the braking force immediately after the vehicle has stopped was conventionally proposed, but in this case, hunting would occur, with the control fluctuating between applying braking force (thus stopping the vehicle) and canceling the braking force (resulting in the vehicle moving backwards).

Therefore, according to the invention, the braking force is prohibited from being cancelled from the time the braking force is applied until a fixed period of time has passed, which enables the backward movement of the vehicle and the cancellation of the braking force to coincide. Further, even if the fixed period of time has not passed, if an accelerator operation is performed, the vehicle is moving forward so the braking force is cancelled.

According to the first aspect and the modification of that first aspect, the brake output determining device may determine the brake output such that the braking force increases when the vehicle body speed exceeds a first vehicle body speed after the initial value of the brake output has been determined. Accordingly, when the vehicle body speed exceeds the first vehicle body speed there is a need to quickly stop the vehicle body, so the brake output is determined so as to increase the braking force.

According to the first aspect and the modification of that first aspect, the brake output determining device may determine the brake output so that the braking force is maintained when the vehicle body speed is equal to, or less than, the first vehicle body speed and greater than a second vehicle body speed after the initial value for the braking output has been determined. In this case, the first vehicle body speed is a speed in the backward direction that is faster than the second vehicle body speed. That is, because the vehicle body speed is equal to, or less than, the first vehicle body speed, the vehicle body does not need to be stopped quickly, and because it is greater than the second vehicle body speed, the braking force should not be cancelled. In this case, therefore, the brake output is determined so that the braking force is maintained.

According to a second aspect of the invention, a vehicle backward movement detection apparatus that detects backward movement of a vehicle at a vehicle body speed that is equal to, or less than, a detection limit of the wheel speed sensor is characterised in that it detects, as a factor related to the vehicle body speed or a gradient of the hill, a period of time from when a braking force of a brake device of the vehicle is cancelled until the vehicle body speed in a backward direction of the vehicle on a hill reaches a predetermined state.

That is, if this period of time is detected, it is possible to detect the vehicle body speed or the gradient of the hill even if the vehicle body speed is equal to, or less than, the detection limit, because there is a correlation between that period of time and the vehicle body speed or the gradient of the hill. The detected vehicle body speed or gradient of the hill can then be used in the braking force control.

The vehicle braking force control apparatus and vehicle backward movement detection apparatus according to this invention thus enables the braking force to be accurately controlled even when the vehicle body speed is low.

According to a third aspect of the invention, a vehicle braking force control method comprising the steps of detecting a period of time from when a braking force of the brake device is cancelled until a backward movement of a vehicle on a hill reaches a predetermined state; determining a brake output according to the detected period of time; and applying the braking force in response to the determined brake output.

According to a fourth aspect of the invention, a vehicle backward movement detection method comprising the steps of detecting a speed of a wheel; and detecting backward movement of a vehicle at a vehicle body speed equal to, or less than, a detection limit of the wheel speed sensor, as a factor related to the vehicle body speed, a period of time from when a braking force of a brake device of the vehicle is cancelled until the vehicle body speed in a backward direction of the vehicle on a hill reaches a predetermined state.

According to a fifth aspect of the invention, a vehicle braking force control apparatus provided with a brake device includes time detecting means for detecting a period of time from when a braking force of the brake device is cancelled until a backward movement of a vehicle on a hill reaches a predetermined state; brake output determining means for determining a brake output according to the period of time detected by the time detecting means; and controlling means for applying the braking force in response to the brake output determined by the brake output determining means.

BRIEF DESCRIPTION OF THE DRAWINGS

The above-mentioned objects, features, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Figure 1A:
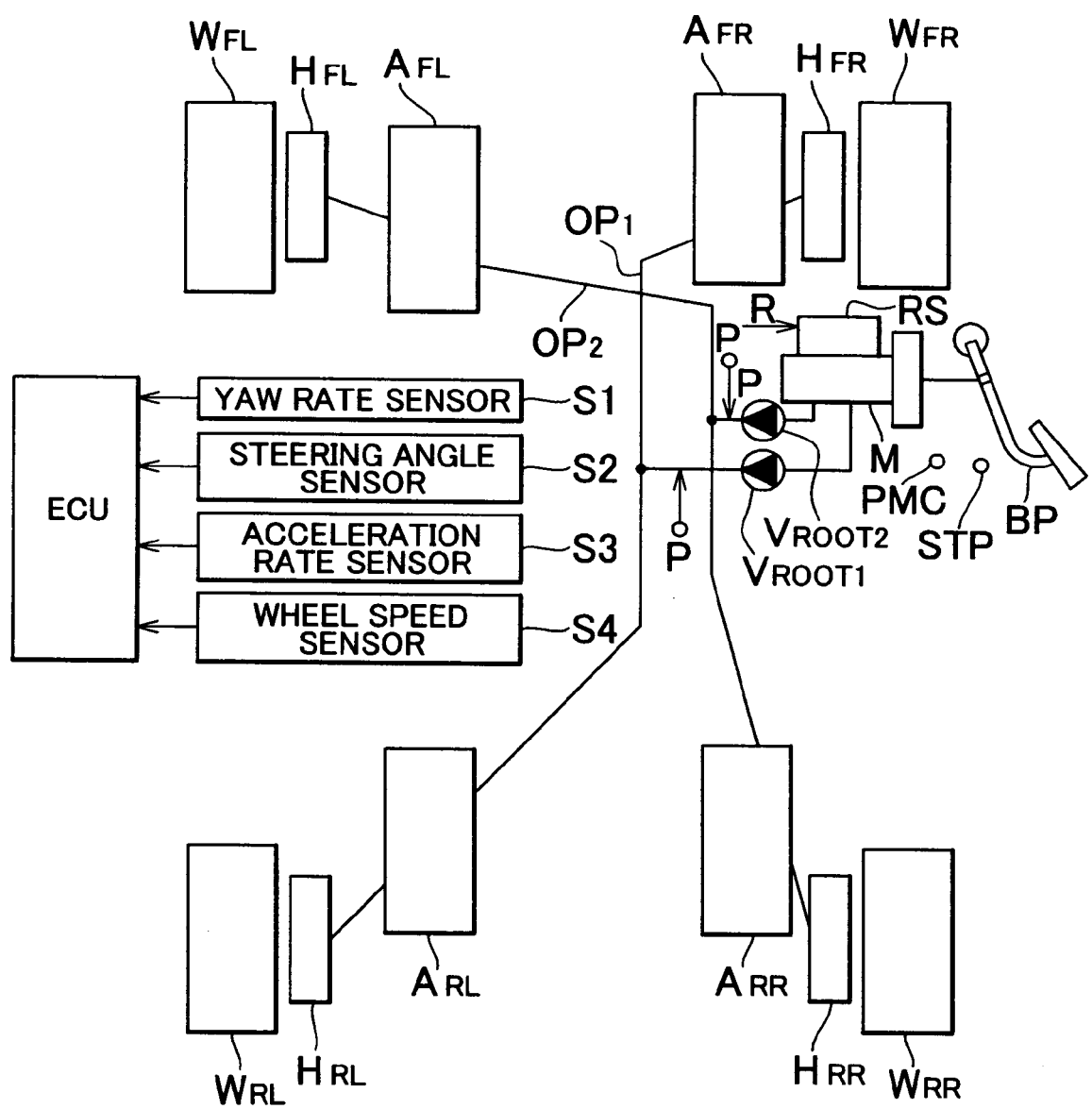
FIG. 1A is a block diagram of a vehicle provided with a behavior control apparatus for a vehicle according to one exemplary embodiment of the invention.

In the following description and the accompanying drawings, the vehicle braking force control apparatus and vehicle backward movement detection apparatus will be described in more detail in terms of exemplary embodiments. In the description, like elements will be denoted by like reference numerals and redundant descriptions thereof will be omitted.

Figure 1B:
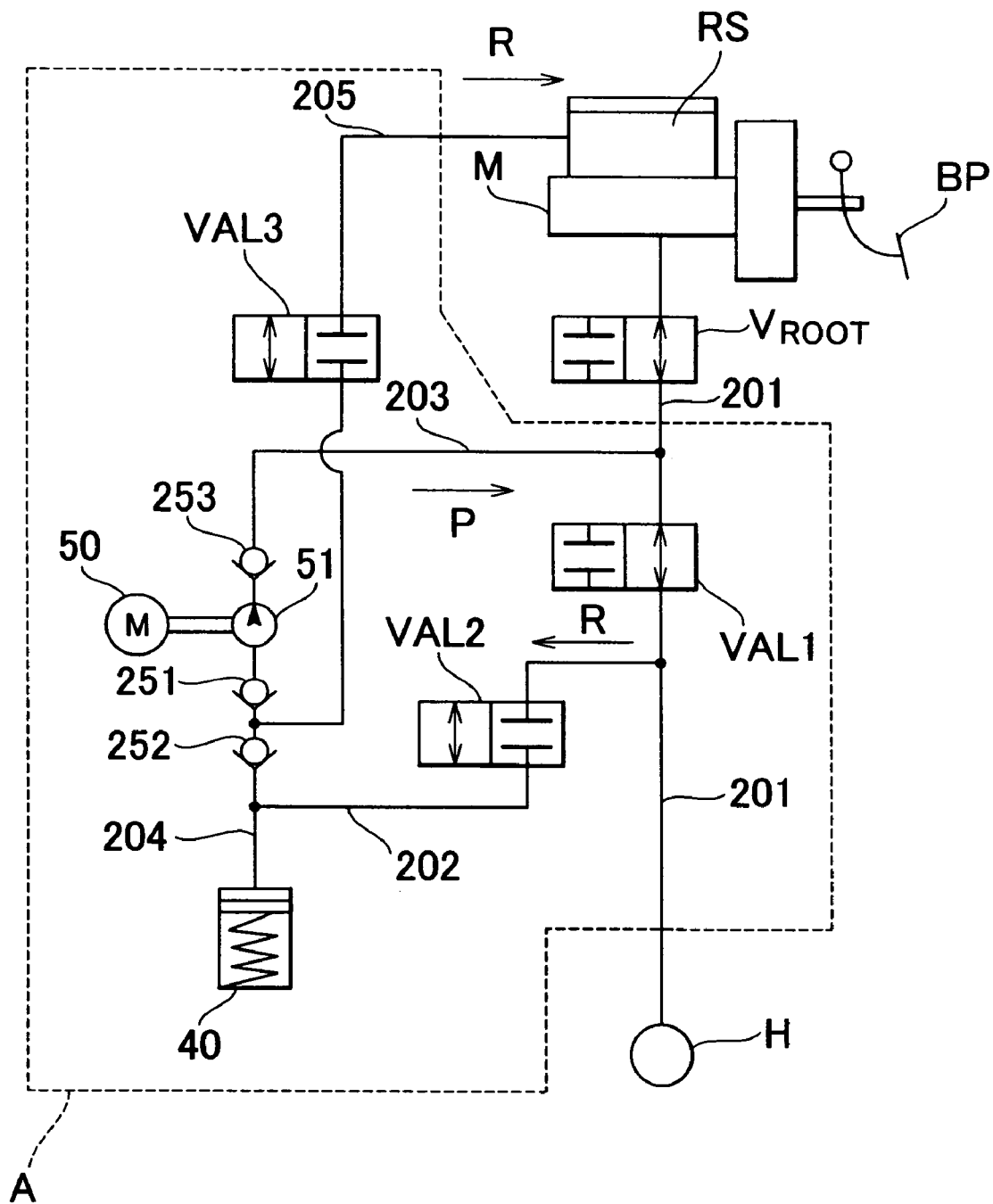
FIG. 1B is a detailed view of the same.

FIG. 1A is a block view of a vehicle provided with a behavior control apparatus for a vehicle according to an exemplary embodiment. FIG. 1B is a detailed view of a hydraulic pressure control valve mechanism A (=$A_{FL}$, $A_{FR}$, $A_{RL}$, and $A_{RR}$) shown in FIG. 1A.

The vehicle is provided with two front wheels $W_{FL}$ and $W_{FR}$ and two rear wheels $W_{RL}$ and $W_{RR}$ on the vehicle body. Each wheel $W_{FL}$, $W_{FR}$, $W_{RL}$, and $W_{RR}$ is provided with a corresponding wheel cylinder H (=$H_{FL}$, $H_{FR}$, $H_{RL}$, and $H_{RR}$) (brake device). The wheel cylinders $H_{FL}$, $H_{FR}$, $H_{RL}$, and $H_{RR}$ are all connected to a master cylinder M via hydraulic pressure passages. A brake pedal BP is linked to a piston of the master cylinder M.

When the brake pedal BP is depressed, fluid pressure in the master cylinder M rises, and master cylinder pressure is essentially transmitted to the wheel cylinders $H_{FL}$, $H_{FR}$, $H_{RL}$, and $H_{RR}$ via the hydraulic pressure passages. The hydraulic pressure passages are lines laid in an X shape. A hydraulic pressure passage OP1 of one system corresponds to the wheel cylinders $H_{FR}$ and $H_{RL}$ of the front right and left rear wheels, and a hydraulic pressure passage OP2 of another system corresponds to the wheel cylinders $H_{FL}$ and $H_{RR}$ of the left front and right rear wheels. These two hydraulic pressure passages OP1 and OP2 cross each other in the shape of an X.

A first root valve $V_{ROOT\ 1}$ is provided on the upstream side toward the master cylinder M in one of the hydraulic pressure passages (i.e., the hydraulic pressure passage that includes the wheel cylinders $H_{FR}$ and $H_{RL}$ of the right front and left rear wheels) OP1. A second root valve $V_{ROOT\ 2}$ is provided on the upstream side toward the master cylinder M in the other hydraulic pressure passage (i.e., the hydraulic pressure passage that includes the wheel cylinders $H_{FL}$ and $H_{RR}$ of the left front and right rear wheels) OP2. Passages that transmit master cylinder pressure to the wheel cylinders are also provided separately which bypass the root valves.

At the end side of the hydraulic pressure passage OP1 of each wheel are end valves VAL1 and VAL2 for increasing, maintaining, or decreasing pressure during ABS (antilock brake system) control, and an intake valve VAL3 for controlling the supply of brake fluid (oil) in the hydraulic pressure passage from a reservoir tank RS to the end valves.

The hydraulic pressure control valve mechanism A is provided with a hydraulic pressure passage 201 that connects the master cylinder M and the wheel cylinders H; a hydraulic pressure passage 203 which feeds the brake fluid to the end valve VAL1 to maintain the hydraulic pressure, and which connects the hydraulic pump 51 and the hydraulic pressure passage 201; a motor 50; a hydraulic pump 51 that is driven by the motor 50; a check valve 253 disposed in the hydraulic pressure passage 203; a hydraulic pressure passage 202 for leading the wheel cylinder pressure to a reservoir 40 via the hydraulic pressure passage 201; the end valve VAL2 for decreasing pressure, provided in the hydraulic pressure passage 202; a hydraulic pressure passage 204 that connects the reservoir 40 and the hydraulic pump 51; and check valves 251 and 252 provided in the hydraulic pressure passage 204.

The reservoir tank RS that contains the brake fluid is mounted to the master cylinder M. The hydraulic pump is driven by the motor 50 to pump brake fluid from the reservoir RS such that a hydraulic pressure P is supplied to the hydraulic pressure passages 203 and 201 (OP1 and OP2). Also, when the end valve VAL2 for decreasing pressure is open, the wheel cylinder pressure of each wheel decreases and the hydraulic pressure P returns to the reservoir tank RS.

Here, the root valves $V_{ROOT}$ ($V_{ROOT\ 1}$ and $V_{ROOT\ 2}$) are linear valves capable of controlling the valve closing pressure in response to an electric signal supplied from another component, although the invention does not limit the root valves to being linear valves. The electric signal is an electric current supplied by the electronic control unit ECU. The higher the current value of this electric current, the greater the valve closing pressure of the linear valves. The pressure from the upstream side applied to each end valve is the sum of the valve closing pressure of the linear valve added to the master cylinder pressure. That is, increasing the amount of current supplied to the linear valve increases the pressure at the end side.

The electronic control unit ECU receives signals from a yaw rate sensor S1, a steering wheel steering angle sensor S2, an acceleration rate sensor S3, and a wheel speed sensor S4. The root valves $V_{ROOT\ 1}$ and $V_{ROOT\ 2}$, and the end valves VAL1, VAL2, and VAL3 are opened and closed based on the received detection values.

Here, a stop switch STP is provided in a forward location so that it is activated early on in a stroke of the brake pedal BP. Also, a master cylinder pressure sensor PMC is provided in the hydraulic pressure passage. The stop switch STP outputs a signal (i.e., turns on) when the brake pedal BP is at or beyond the location of the stop switch STP.

Normally during behavior control of the vehicle, the root valves (switching valves) $V_{ROOT\ 1}$ and $V_{ROOT\ 2}$ are closed and the vehicle behavior is controlled (increased, decreased, or maintained) by the end valves (pressure regulating valves) VAL1, VAL2, and VAL3 of the wheel cylinders.

During a pressure increase, brake fluid is supplied from the reservoir tank RS side to the wheel cylinders H through the hydraulic pressure passages 205 and 203 while the end valve VAL1 is open and the pressure decrease valve VAL2 is closed. The hydraulic pressure flow time (continuation time) with respect to the unit time of the end valve VAL1 serving as an increase pressure valve becomes the increase pressure duty ratio.

During a pressure decrease, the end valve VAL2 is open. The hydraulic pressure flow time (continuation time) with respect to the unit time of the end valve VAL2 serving as a decrease pressure valve becomes the decrease pressure duty ratio.

When the pressure is maintained, the end valve VAL1 serving as a pressure maintaining valve is closed.

The various controls executed by the electronic control unit ECU will now be described.

Figure 2:
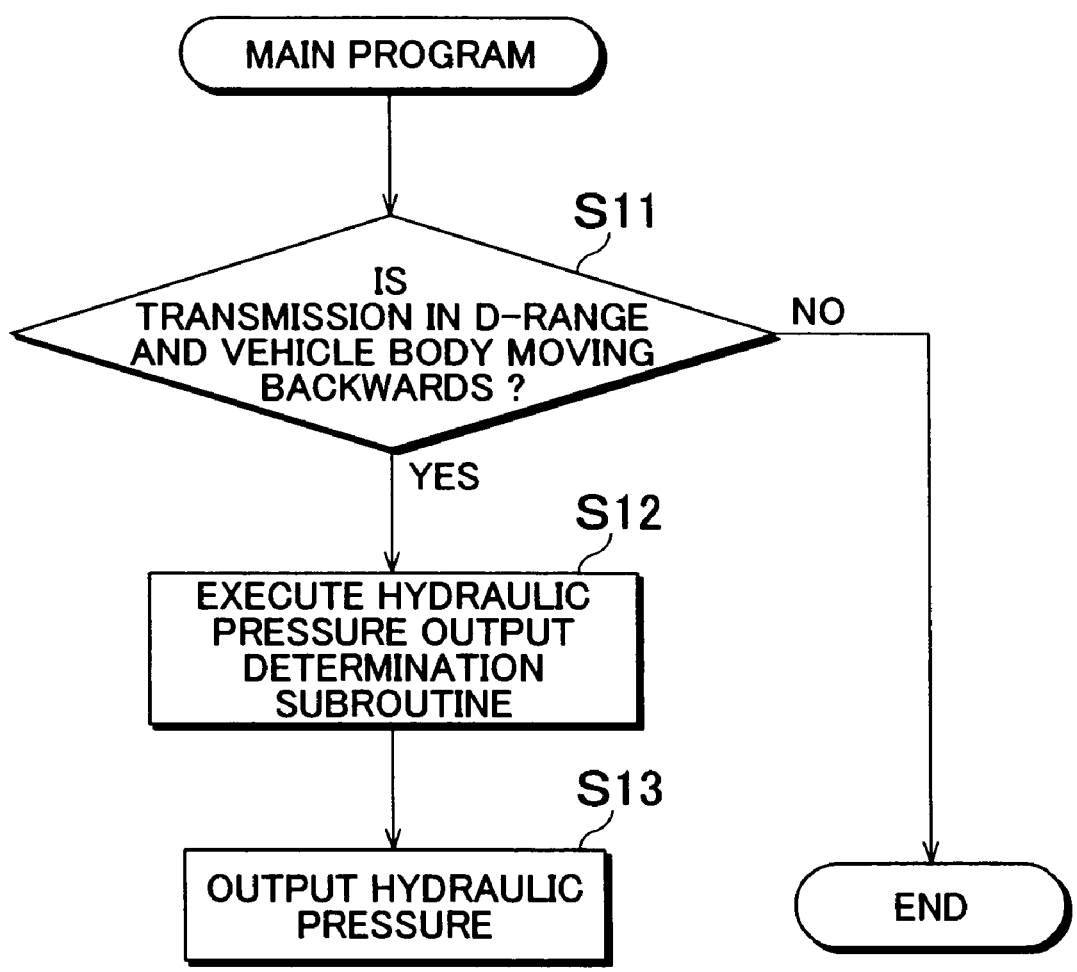
FIG. 2 is a flowchart of a main program executed by an electronic control unit ECU.

FIG. 2 is a flowchart of a main program executed by the electronic control unit ECU.

In this example, the vehicle is stopped in a position in which the front wheels are uphill.

When the main program starts, it is determined whether the transmission of the vehicle is in the D (drive) range, and whether the vehicle is moving backwards (step S11). If the determination in step S11 is NO, the control ends.

If the determination in step S11 is YES, however, a hydraulic pressure output determination subroutine is executed (step S12) and the determined hydraulic pressure output is output to each end valve (step S13). That is, when a pressure increase mode is executed, the end valve VAL1 opens to increase the duty ratio (i.e., the braking force increases). When a pressure decrease mode is executed, the end valve VAL2 is opened to the decrease the pressure (i.e., the braking force decreases). When the pressure maintaining mode is executed, the end valve VAL1 switches (i.e., the braking force is maintained).

The hydraulic pressure output, i.e., the brake output, is controlled by the various valves so that the actual braking force matches that value. That is, the pressure increase mode, the pressure decrease mode, and the pressure maintaining mode are executed by opening or closing the valves to increase or decrease the hydraulic pressure to the braking force corresponding to the brake output. The pressure increase mode is executed when the actual braking force is lower than the brake output which is the target value, the pressure decrease mode is executed when the actual braking force is higher than the brake output which is the target value, and the pressure maintaining mode is executed when the actual braking force is equal to the brake output which is the target value.

Figure 3:
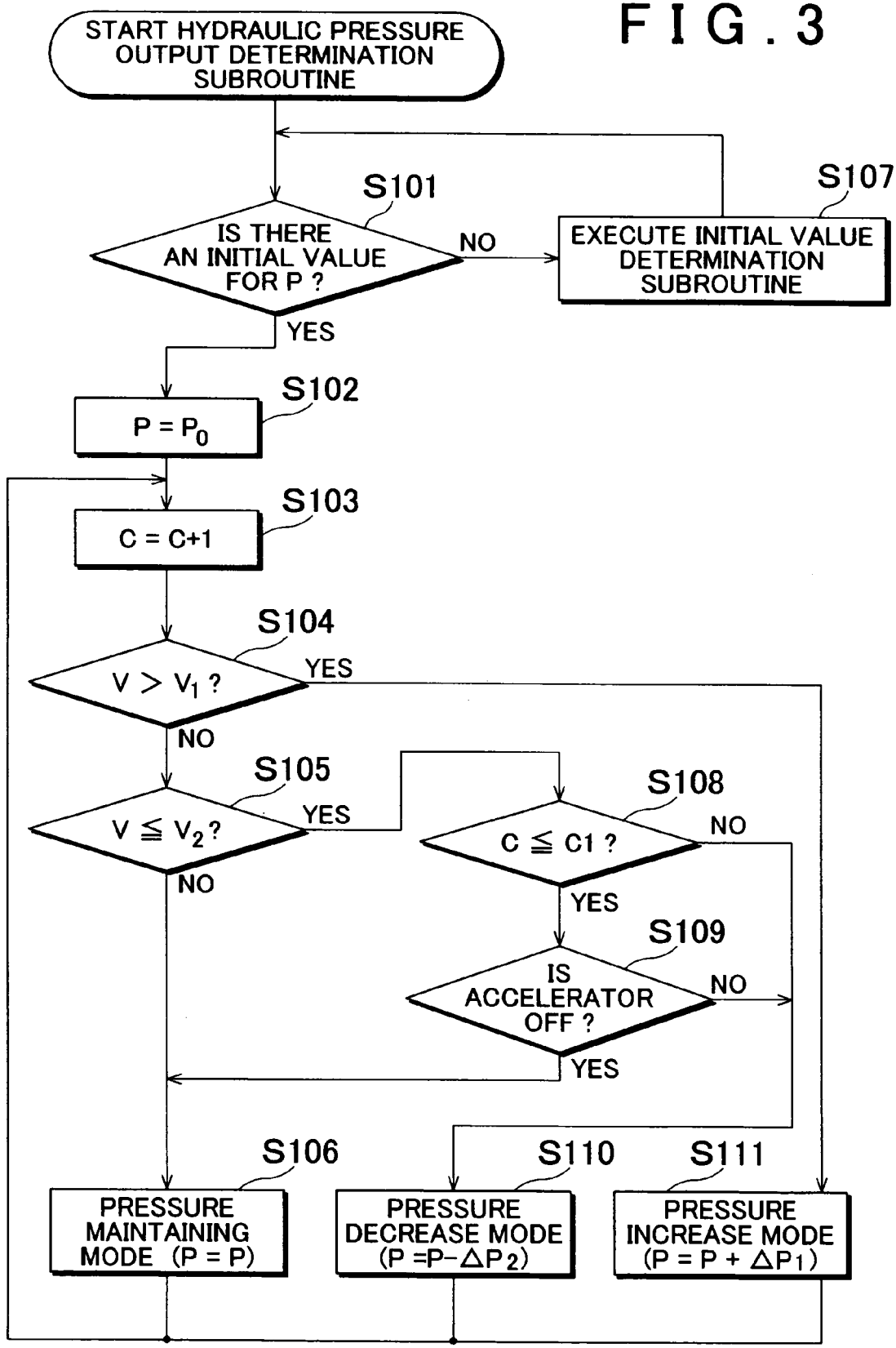
FIG. 3 is a flowchart of a hydraulic pressure output determination subroutine (brake output determining means) executed by the electronic control unit ECU.

FIG. 3 is a flowchart of a hydraulic pressure output determination subroutine (brake output determining means) executed by the electronic control unit ECU.

First it is determined whether there is the initial value of the brake output P (step S101). If there is no brake output P, an initial value determination subroutine is executed and an initial value P0 is obtained (step S107). If there is an initial value P0, that initial value P0 is assigned as the brake output P (S102).

At the point when the initial value P0 is obtained, the initial value P0 of the brake output is output after a fixed period of time passes after the braking force of the vehicle is cancelled. The brake output after the initial value is determined as follows.

First, a control cycle counter is started by adding 1 to a count value C. That is, the time elapsed after the initial value was determined starts to be measured (step S103). The counter value C is reset (i.e., C=0) if it exceeds a specified count upper limit value.

After the initial value of the brake output has been determined, it is then determined whether the vehicle body speed V exceeds a first vehicle body speed $V_1$ (step S104). If the vehicle body speed V exceeds the first vehicle body speed $V_1$, the brake output P is determined so that the braking pressure increases (pressure increase mode: $P=P+\Delta P_1$) (step S111). If the vehicle body V exceeds the first vehicle body speed $V_1$, then it is necessary that the vehicle be stopped quickly. In this case, therefore, a brake output is determined so that the braking force increases.

If the vehicle body speed V does not exceed the first vehicle body speed $V_1$ after the initial value of the brake output has been determined, it is then determined whether the vehicle body speed V is equal to, or less than, a second vehicle body speed $V_2$ (step S105). If it is determined that the vehicle body speed V greater than the second vehicle body speed $V_2$ (i.e., NO in step S105), then the brake output is determined so that the braking force is maintained and the pressure maintaining mode (P=P) is executed (step S106).

The first vehicle body speed $V_1$ is a speed in the backwards direction that is faster than the second vehicle body speed $V_2$. That is, if the determination in step S105 is NO, then the vehicle body speed V is equal to, or less than, the first vehicle body speed $V_1$ so there is no need to stop the vehicle quickly. On the other hand, because the vehicle body speed V is greater than the second vehicle body speed $V_2$, the braking force is not cancelled. Instead, a brake output P is determined so that the braking force is maintained.

If the vehicle body speed V does not exceed the second vehicle body speed $V_2$, i.e., if the determination in step S105 is YES, then it is determined whether the count value C is greater than a threshold value C1, i.e., whether a fixed period of time has passed from the time that the initial value of the brake output was determined (step S108). If the count value C is greater than the threshold value C1, then the pressure decrease mode ($P=P-\Delta P_2$) is executed. Conventionally, control that cancelled the braking force immediately after the vehicle is stopped was proposed, but in this case, hunting would occur, with the control fluctuating between applying braking force (thus stopping the vehicle) and canceling the braking force (resulting in the vehicle moving backwards). In this example, the braking force is prohibited from being cancelled until a fixed period of time has passed after the initial value of the brake output is determined, i.e., until a fixed period of time has passed from the time the braking force is applied, which enables the backward movement of the vehicle and the cancellation of the braking force to coincide.

Further, when the time passed after the braking force was applied is equal to, or less than, a fixed period of time, i.e., when the count value C is equal to, or less than, the threshold value C1 (i.e., YES in step S108), it is then determined whether there is an accelerator operation, i.e., whether the accelerator is off (step S109). Even if the accelerator is off, the pressure decrease mode is executed (step S110). Here, the brake output is determined such that the braking force is prohibited from being cancelled from the time that the time starts to be measured (step S103) until there is an accelerator operation. That is, when an accelerator operation is performed, the vehicle starts to move so the braking force is cancelled even if the fixed period of time has not yet passed. If the accelerator is off (i.e., YES in step S109), the pressure maintaining mode is executed (step S106).

Figure 4:
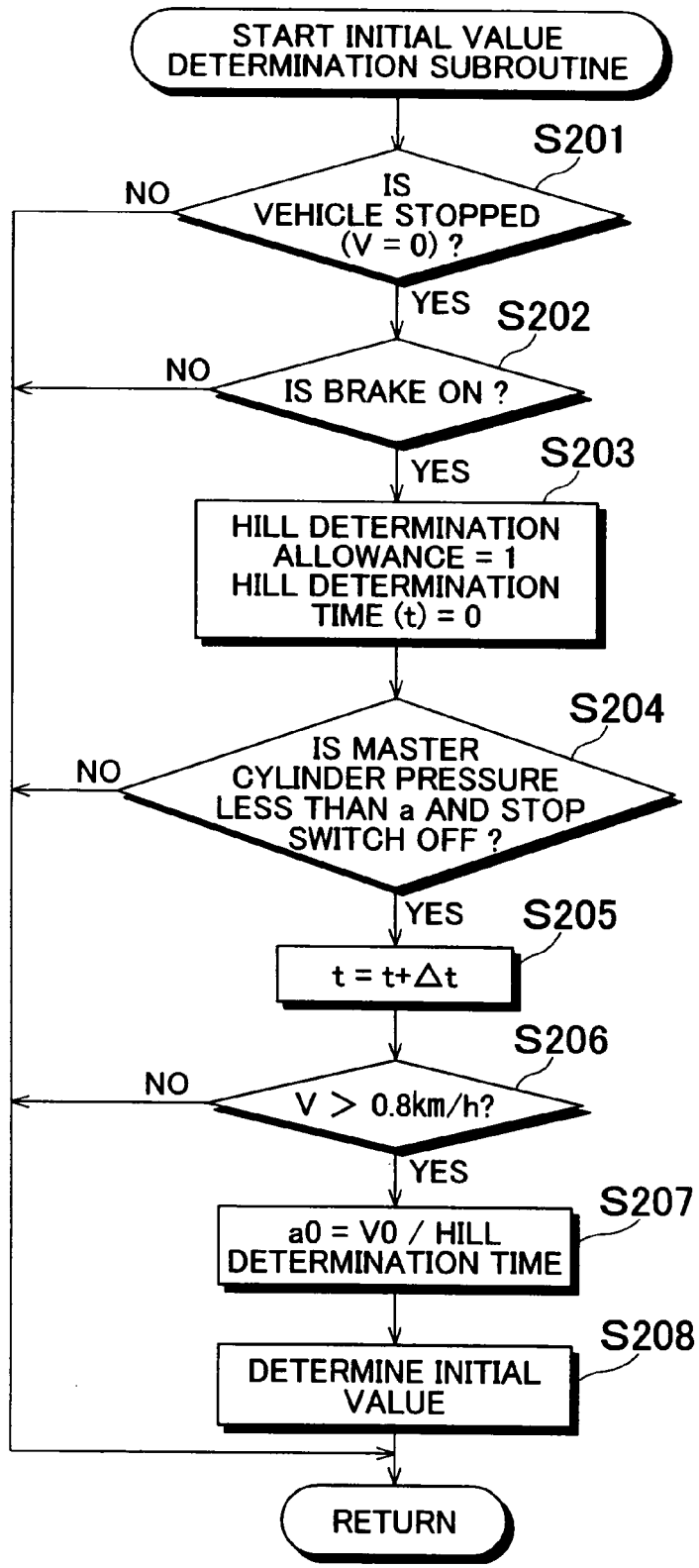
FIG. 4 is a flowchart of an initial value determination subroutine (brake output determining means) executed by the electronic control unit ECU.

FIG. 4 is a flowchart of the initial value determination subroutine (brake output determining means) executed by the electronic control unit ECU.

First it is determined whether the vehicle is stopped (step S201). The wheel speed sensors can detect whether the wheels are stopped and the direction of rotation if they are not stopped. It is determined that the vehicle is stopped when the signal from the wheel speed sensors is zero.

When the vehicle is stopped (i.e., YES in step S201), it is determined whether the brake is on (step S202). This determination can be made based upon whether the brake pedal is being depressed, i.e., whether the stop switch STP is on. The determination can also be made based on whether the output of the master cylinder pressure sensor is greater than a specified value.

Next, when a hill determination is allowed, a flag is set to 1 and a hill determination time (t) is set to 0 (step S203).

Then it is determined whether the brake is off (step S204). Here, it is determined that the brake is off (i.e., the braking force cancelled) when the master cylinder pressure is less than a cancel determination threshold value a and the stop switch STP is off.

That is, this vehicle braking force control apparatus is provided with cancellation detecting means for detecting cancellation of the braking force. The cancellation detecting means detects cancellation of the braking force by detecting release of the brake pedal BP and/or by detecting when the braking force (master cylinder pressure) has become less than the cancel determination threshold a. When the brake pedal BP is released or the braking force is less than the cancel determination threshold a, the braking force is cancelled, thus cancellation of the braking force is able to be detected.

When it is determined that the brake if off, Δt is added to the hill determination time (t) (step S205) and it is determined (in step S206) whether the vehicle body speed V is greater than a predetermined value (here, the threshold value (in this example, 0.8 km/h)) V0 which is equal to, or greater than, the detection limit. The addition in step S205 is repeated executed until the vehicle body speed V exceeds the predetermined value V0.

That is, the vehicle braking force control apparatus which includes a brake device is provided with time detecting means for detecting a period of time t0 (=t+Δt×the number of times the addition step is repeated) from the time the braking force of the brake device is cancelled (step S204) until the vehicle body speed V of the vehicle on the hill in the backwards direction reaches the predetermined state (i.e., YES in step S206). The predetermined state refers, for example, to a state of the vehicle in which the vehicle body speed is equal to a predetermined speed, the distance moved by the vehicle body (a cumulative value of the number of output pulses from a wheel speed sensor) is equal to a predetermined distance, or the acceleration rate of the vehicle (a time derived value of the wheel speed) is equal to a predetermined acceleration rate. In this example, the predetermined state is a state in which the vehicle body speed V becomes the threshold value V0 which is equal to, or greater than, the detection limit. This is because if the vehicle body speed V0 is detectable by a wheel speed sensor or the like, then accurate braking force control can be performed.

When the braking force of the brake device in the vehicle is cancelled on a hill, gravity pulls the vehicle to a lower position. Because the vehicle body speed at the start of this movement is low, it is often difficult to measure accurately with a wheel speed sensor. This example thus focuses on the period of time t0 up until the signal indicative of a vehicle body speed that can be detected with some degree of accuracy by a wheel speed sensor or the like starts to be output. That is, this example focuses on the period of time during which accurate measurement was conventionally not possible.

If the gradient of the hill is steep, the vehicle body speed will probably reach a predetermined speed quickly once the braking force is cancelled. On the other hand, if the gradient of the hill is gentle, it will probably take time for the vehicle body speed to reach the predetermined speed once the braking force is cancelled.

The time detecting means detects the period of time t0 from when the braking force of the brake device is cancelled until the vehicle body speed in the backward direction of the vehicle on the hill reaches the predetermined state. The period of time t0 depends on the gradient of the hill. That is, an estimated vehicle body acceleration rate a0 is the quotient of the estimated vehicle body speed (threshold value V0) divided by the hill determination time t0. When necessary, this kind of value can be used in the control.

Here, because control can be performed if the initial value P0 of the brake output P is obtained, the initial value P0 of the brake output is determined based on a map of the period of time t0 and the initial value P0 of the brake output (step S208).

In this way, the apparatus is provided with brake output determining means (step S208) for determining the brake output according to the period of time t0 detected by the time detecting means, and controlling means (see step S13 in FIG. 1) for applying a braking force corresponding to the brake output (the initial value P0 in this example) determined by the brake output determining means. The brake output determining means determines the brake output according to the period of time t0 and the controlling means, i.e., the ECU, controls the braking force corresponding to the determined brake output, so braking force control according to the gradient of the hill is possible even when the vehicle body speed V is extremely low such that it is undetectable.

Figure 5:
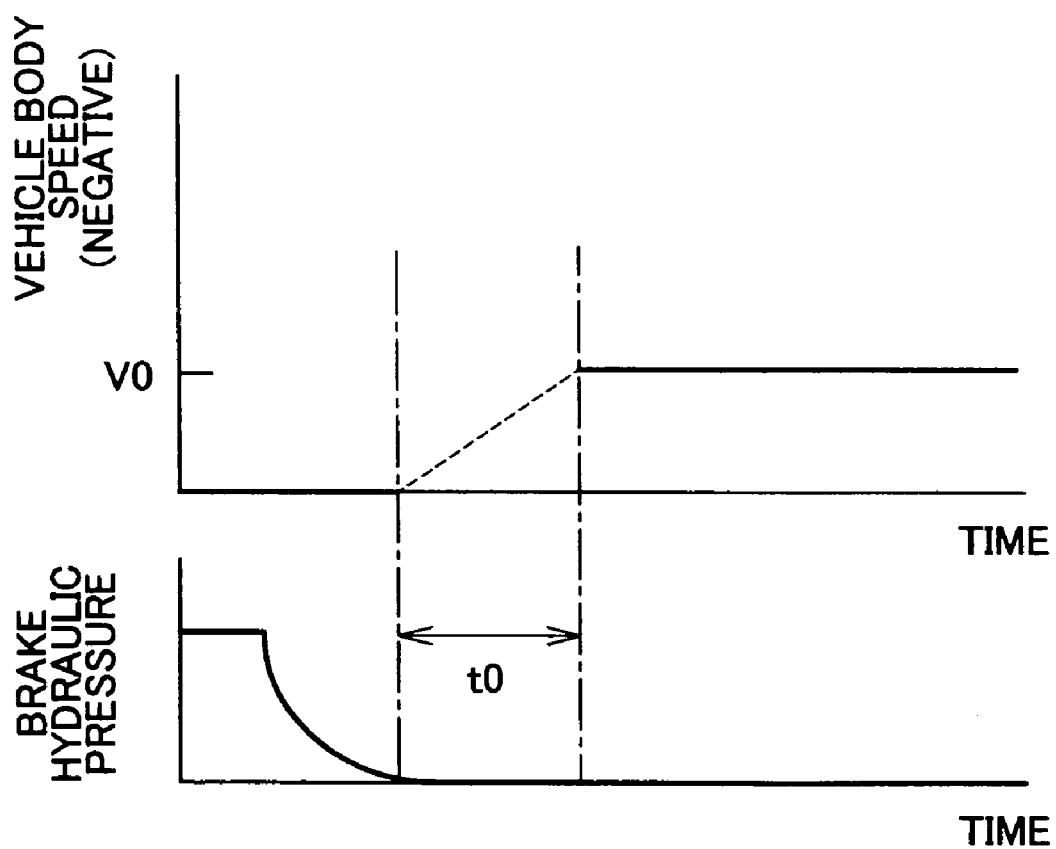
FIG. 5 is a graph showing the relationship between the vehicle body speed V over time and the brake hydraulic pressure (master cylinder pressure or wheel cylinder pressure) over time.

FIG. 5 is a graph showing the relationship between the vehicle body speed V over time and the brake hydraulic pressure (master cylinder pressure and wheel cylinder pressure) over time.

A relatively long pressure maintaining mode (step S106 in FIG. 3) and pressure decrease mode (step S110 in FIG. 3) are often applied if the accelerator pedal is depressed when the period of time t0 from after it has been determined that the brake is off until the vehicle body speed V exceeds the predetermined value V0 has passed in step S204. Therefore, the vehicle body speed V0 is not increased but is made a fixed value V0 or brought down to zero. The vehicle body speed will increase over time unless braking pressure is applied. Here, a brake output (wheel cylinder pressure) of a fixed value is generated after the time t0 has passed.

Figure 6:
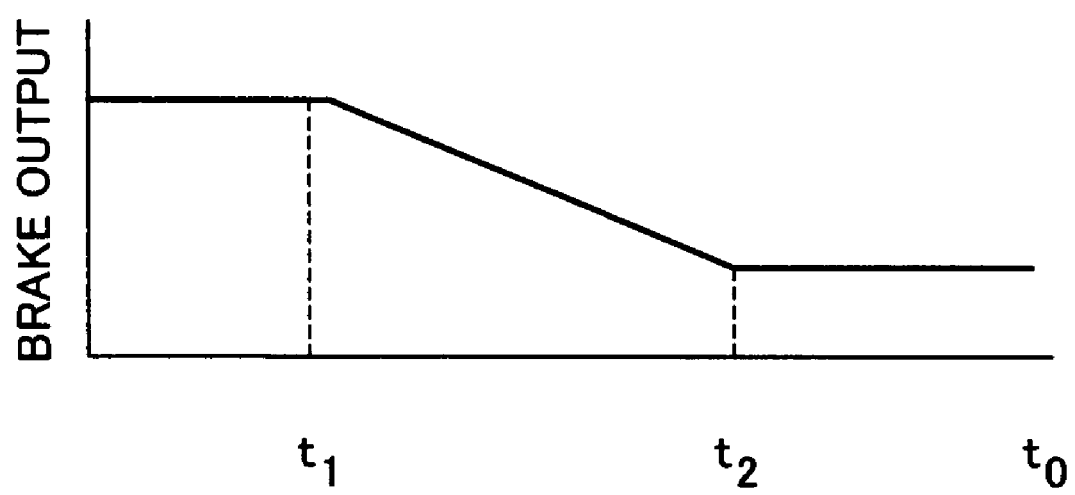
FIG. 6 is a graph showing the relationship between the time t0 and the initial value P0 of the brake output.

FIG. 6 is a graph showing the relationship between the period of time t0 and the initial value P0 of the brake output.

This graph is stored as a map in the ECU and is used when determining the initial value (step S208). When the period of time t0 is less than time t1, the initial value P0 of the brake output is set to the maximum value. On the other hand, if the period of time t0 is greater than time t2, the initial value P0 of the brake output is set to the minimum value. During the period between time t1 and time t2, the initial value P0 of the brake output is set lower when the period of time t0 detected by the time detecting means is long than when it is short.

That is, when this period of time t0 is long it means that the gradient of the hill is small, so (the initial value P0 of) the brake output is preferably set small so that braking is performed gently and smoothly. When that period of time t0 is short, on the other hand, it means that the gradient of the hill is large, so the brake output is set relatively large so that braking can be performed quickly.

The brake devices are provided on both the front wheels $W_{FL}$ and $W_{FR}$ and the rear wheels $W_{RL}$ and $W_{RR}$ of the vehicle. The brake output determining means determines (the initial value P0 of) the brake output P such that the braking force of the brake devices of the rear wheels $W_{RL}$ and $W_{RR}$ is set higher than the braking force of the brake devices of the front wheels $W_{FL}$ and $W_{FR}$ when the slope of the hill is steep, i.e., when the period of time t0 is less than the predetermined value than when the period of time t0 is greater than the predetermined value. Alternatively, a correction may be added as a condition to the brake output P determined thereafter.

That is, when the vehicle moves backwards on a hill, a greater load is placed on the rear wheels $W_{RL}$ and $W_{RR}$ than on the front wheels $W_{FL}$ and $W_{FR}$. Therefore, making the braking force of the brake devices on the rear wheels $W_{RL}$ and $W_{RR}$ relatively high enables the vehicle to be effectively brought to a stop.

The apparatus described above is a vehicle backward movement detection apparatus that detects when the vehicle is sliding backwards. That is, a vehicle backward movement detection apparatus, which detects backward movement of the vehicle at a vehicle body speed V equal to, or less than, the detection limit of a wheel speed sensor, detects, as a factor related to the vehicle body speed V or the gradient of the hill, the period of time t0 from when the braking force of the brake device of the vehicle has been cancelled until the vehicle body speed in the backwards direction of the vehicle on the hill reaches a predetermined state. Because this detection apparatus detects the period of time t0 and there is a correlation between that period of time t0 and the vehicle body speed or the gradient of the hill, the vehicle body speed or the gradient of the hill can therefore be detected even if the vehicle body speed is equal to, or less than, the detection limit and the detected vehicle body speed or gradient of the hill used in the braking force control.

This invention may be used in a vehicle braking force control apparatus and vehicle backward movement detection apparatus. More particularly, this invention may be used in a vehicle backward movement detection apparatus that detects backward movement of a vehicle on a hill, and a vehicle braking force control apparatus that performs braking based on that detected backward movement.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle braking force control apparatus, which is provided with a brake device, comprising:
   a time detecting device which detects a period of time from when a braking force of the brake device is cancelled until a backward movement of a vehicle on a hill reaches a predetermined state; and
   a controller which applies the braking force in response to the period of time detected by the time detecting device.

2. The vehicle braking force control apparatus according to claim 1, wherein the predetermined state is a state in which a vehicle body speed is equal to a predetermined value that is equal to, or greater than, a detection limit.

3. The vehicle braking force control apparatus according to claim 1, wherein cancellation of the braking force is detected by detecting release of a brake pedal.

4. The vehicle braking force control apparatus according to claim 1, wherein cancellation of the braking force is detected by detecting that the braking force is less than a cancellation determination threshold value.

5. The vehicle braking force control apparatus according to claim 1, wherein an initial value of the brake output is set smaller when a period of time detected by the time detecting device is longer than a predetermined period of time than when the period of time detected by the time detecting device is shorter than the predetermined period of time.

6. The vehicle braking force control apparatus according to claim 1, wherein a first predetermined period of time is set longer than a second predetermined period of time, and an initial value of the brake output is set smaller when the period of time detected by the time detecting device is longer than the first predetermined period of time than when the period of time detected by the time detecting device is shorter than the second predetermined period of time.

7. The vehicle braking force control apparatus according to claim 1, wherein the brake device is provided on each of front wheels and rear wheels of the vehicle, and the brake output determining device determines the brake output so that the braking force of the brake devices on the rear wheels is set higher than the braking force of the brake devices on the front wheels when the period of time is shorter than a predetermined period of time than when the period of time is longer than the predetermined period of time.

8. The vehicle braking force control apparatus according to claim 1, wherein a first predetermined period of time is set longer than a second predetermined period of time, the brake device is provided on each of front wheels and rear wheels of the vehicle, and the brake output determining device determines the brake output so that the braking force of the brake devices on the rear wheels is set higher than the braking force of the brake devices on the front wheels when the period of time is shorter than the second predetermined period of time than when the period of time is longer than the first predetermined period of time.

9. The vehicle braking force control apparatus according to claim 1, wherein the brake output determining device determines the brake output so that the braking force is prohibited from being cancelled from the time the braking force is applied until a fixed period of time passes or until an accelerator operation is performed.

10. The vehicle braking force control apparatus according to claim 1, wherein the brake output determining device determines the brake output so that the braking force increases when the vehicle body speed exceeds a first vehicle body speed after the initial value of the brake output has been determined.

11. The vehicle braking force control apparatus according to claim 1, wherein the brake output determining device determines the brake output so that the braking force is maintained when the vehicle body speed is equal to, or less than, a first vehicle body speed and greater than a second vehicle body speed after the initial value for the braking output has been determined.

12. A vehicle backward movement detection apparatus comprising:
   a wheel speed sensor that detects the speed of a wheel; and
   a detecting portion that detects backward movement of a vehicle at a vehicle body speed equal to, or less than, a detection limit of the wheel speed sensor, wherein the detecting portion detects, as a factor related to the vehicle body speed, a period of time from when a braking force of a brake device of the vehicle is cancelled until the vehicle body speed in a backward direction of the vehicle on a hill reaches a predetermined state.

13. A vehicle braking force control method comprising the steps of:
   detecting a period of time from when a braking force of the brake device is cancelled until a backward movement of a vehicle on a hill reaches a predetermined state; and
   applying the braking force in response to the detected period of time.

14. A vehicle backward movement detection method comprising the steps of:
   detecting a speed of a wheel; and
   detecting backward movement of a vehicle at a vehicle body speed equal to, or less than, a detection limit of the wheel speed sensor, as a factor related to the vehicle body speed, a period of time from when a braking force of a brake device of the vehicle is cancelled until the vehicle body speed in a backward direction of the vehicle on a hill reaches a predetermined state.

15. A vehicle braking force control apparatus, which is provided with a brake device, comprising:

time detecting means for detecting a period of time from when a braking force of the brake device is cancelled until a backward movement of a vehicle on a hill reaches a predetermined state; and controlling means for applying the braking force in response to the period of time detected by the time detecting means.

16. A vehicle braking force control apparatus, which is provided with a brake device, comprising:

a time detecting device which detects a period of time from when a switch for a brake pedal lamp is off until a backward movement of a vehicle on a hill reaches a predetermined state; and a controller which applies the braking force in response to the period of time detected by the time detecting device.

17. A vehicle braking force control apparatus, which is provided with a brake device, comprising:

a time detecting device which detects a period of time from when a brake pedal is released until a backward movement of a vehicle on a hill reaches a predetermined state; and a controller which applies the braking force in response to the period of time detected by the time detecting device.

18. A vehicle braking force control apparatus, which is provided with a brake device, comprising:

a time detecting device which detects a period of time from when a master cylinder pressure is less than a predetermined value until a backward movement of a vehicle on a hill reaches a predetermined state; and a controller which applies the braking force in response to the period of time detected by the time detecting device.

* * * * *